US012790531B2

(12) United States Patent
Shepherd et al.

(10) Patent No.: US 12,790,531 B2
(45) Date of Patent: Nov. 10, 2026

(54) FRESHWATER BASED DRILLING FLUIDS USING A CROSSLINKED STARCH

(71) Applicant: Baker Hughes Oilfield Operations LLC, Houston, TX (US)

(72) Inventors: Autumn Shepherd, Katy, TX (US); Gianna Pietrangeli, Houston, TX (US); Ginna Rosero, Houston, TX (US); Sebastian Mesa, Conroe, TX (US)

( * ) Notice: Subject to any disclaimer, the term of this patent is extended or adjusted under 35 U.S.C. 154(b) by 0 days.

(21) Appl. No.: 19/083,877

(22) Filed: Mar. 19, 2025

(65) Prior Publication Data

US 2026/0286210 A1 Sep. 24, 2026

(51) Int. Cl.

*E21B 21/00* (2006.01)
*C09K 8/508* (2006.01)
*C09K 8/528* (2006.01)

(52) U.S. Cl.

CPC .............. *C09K 8/528* (2013.01); *C09K 8/508* (2013.01); *E21B 21/003* (2013.01)

(58) Field of Classification Search

None
See application file for complete search history.

(56) References Cited

U.S. PATENT DOCUMENTS 11,591,508 B2 2/2023 Davis et al.
11,767,457 B2 9/2023 Eyaa Allogo et al.
12,098,321 B1 9/2024 Gotmukle et al.
2002/0117457 A1* 8/2002 Benton .................. C09K 8/528 210/749
2006/0258541 A1* 11/2006 Crews ...................... C09K 8/52 507/203
2009/0023613 A1* 1/2009 Li ............................ C09K 8/94 507/211
2014/0353042 A1* 12/2014 Karale ................... C09K 8/725 175/64
2015/0072901 A1* 3/2015 Samuel .................. C09K 8/516 507/104
2017/0349818 A1* 12/2017 Mirakyan .............. C09K 8/706
2018/0194985 A1 7/2018 Boul
2018/0298266 A1* 10/2018 Marr ........................ C09K 8/00
2019/0277122 A1* 9/2019 Mahmoud ................ C09K 8/74

FOREIGN PATENT DOCUMENTS

WO 2017007978 A1 1/2017

OTHER PUBLICATIONS

American Petroleum Institute, "Field Testing Water-based Drilling Fluids"; API Recommended Practice 13B-1, Fifth 1 Edition, May 2019; 132 pages.
Notification of Transmittal of the International Search Report and Written Opinion for PCT/US2026/017531; European Patent Office; Mailed Jun. 9, 2026; 7 pages.

* cited by examiner

*Primary Examiner* — Andrew Sue-Ako
(74) *Attorney, Agent, or Firm* — Baker Hughes Oilfield Operations LLC

(57) ABSTRACT

A drill-in fluid comprising water, a metal oxide, a modified starch, a bridging agent, and at least one of (a) an ascorbic acid or an isomer thereof or a salt of ascorbic acid or the isomer thereof, (b) polymeric particles, or (c) an emulsion which is a microemulsion or a nanoemulsion can be injected into a wellbore. The drill-in fluid can tolerate relatively high temperatures and form a filter cake that has relatively low lift-off pressures.

12 Claims, No Drawings

FRESHWATER BASED DRILLING FLUIDS USING A CROSSLINKED STARCH

BACKGROUND

In the resource recovery and fluid sequestration industries filter cakes can be used to seal a formation and prevent excessive fluid loss while drilling. Filter cakes can be formed from a drill-in fluid that forms a layer on the walls of a borehole. The filter cake can be removed before cementing to improve cementing and eliminate restrictions on hydrocarbon flow during production.

Water-based (particularly, freshwater) drill-in fluids often use xanthum gum as a viscosifier. Unfortunately, the resulting filter cakes can be difficult to break and can require costly breaker systems to remove the filter cake from the formation. Additionally, filtrate with high viscosity in the porous media increase the pressure requirements for injection operations. Moreover, for water-based drill-in fluids using xanthan gum at temperatures above 250° F. (121° C.) biodegradation starts to occur. To extend the xanthan gum's capability a temperature stabilizer is needed.

Alternate drill-in fluids for formation of filter cakes are desired that avoid the problems found in systems using xanthan gum. For example, it would be desirable to have a drill-in fluid that can operate at higher temperatures (e.g., up to 300° F., particularly 250 to 300° F. (about 120 to about 150° C.), that has reduced skin factor, which can lead to increased injection rates and decreased pressure requirements, and has lower lift-off pressures than xanthum gum based systems.

SUMMARY

Disclosed herein is drill-in fluid comprising water, a metal oxide, a modified starch, a bridging agent, and at least one of (a) an ascorbic acid or an isomer thereof or a salt of ascorbic acid or the isomer thereof, (b) polymeric particles, or (c) an emulsion which is a microemulsion or a nanoemulsion.

Also disclosed herein is a method comprising injecting the drill-in fluid of into a wellbore. The drill-in fluid can tolerate high temperatures of up to 120 to 150° C. and can provide a filter cake that provides low lift off pressures.

DETAILED DESCRIPTION

A detailed description of one or more embodiments of the disclosed apparatus and method are presented herein by way of exemplification and not limitation.

A filter cake can be formed on the formation of a wellbore from drill-in fluid.

The drill-in fluid is an aqueous based fluid, preferably a freshwater drill-in fluid. The drill-in fluid comprises water in amounts of from about 70, from about 75 or from about 80 up to about 95 or up to about 90 weight percent, based on total weight of the drill-in fluid. As a freshwater system, the drill-in fluid preferably comprises no more than about 1000, no more than about 700, no more than about 500 parts per million of monovalent metal ions, provided that metal ions included as a salt of ascorbic acid are excluded when such salt is included in the drill-in fluid.

In addition to the water, the drill-in fluid comprises a metal oxide, preferably where the metal is a divalent metal. Examples of the metal oxide include magnesium oxide, cupric oxide, calcium oxide, iron oxide or zinc oxide. The metal oxide can be provided of particulates, such as in the form of a powder. The particulates can have an average particle size of for example, from 1, from 10, from 15, or from 20 up to 100, up to 90, up to 80, or up to 75 micrometers. Particle size can be the average particle size as stated by the vendor of the particle. Alternatively, particle size and particle size distribution can be measured, for example, by laser diffraction. See also, for example, ISO13320 (2020). As another method, particle size can be determined, for example, by sieve analysis. The metal oxide can be provided in an amount of from about 0.5, from about 0.6, or from about 0.7 up to about 1.5, up to about 1.2, or up to about 1 weight percent based on total weight of the drill-in fluid.

The drill-in fluid further comprises a modified starch which includes cross-linkable groups. Starch is naturally occurring a polymeric carbohydrate (specifically a polysaccharide). The modified starch is chemically modified by addition of functional groups that facilitate cross-linking of the starch with itself and/or with other molecules in the drill-in fluid. For example, the modified starch can cross-link with itself and with bridging agent (e.g. magnesium oxide). The functional groups can be added to the starch, for example, by reacting the starch with a molecule that has a group capable of reacting with the hydroxyl groups ono the starch. Examples of the cross-linkable groups include unsaturated groups (such as ethylenically unsaturated groups, carbonyl groups, cyano groups, and the like), epoxy groups, and hydroxyl groups. Additional, more specific examples include vinyl sulfone, epihalohydrins, formaldehyde, phosphorous oxychloride, trimetaphosphates, adipic-acetic anhydrides, dialdehydes, diepoxides, diisocyanates, bis(hydroxymethyl)ethylene urea, and the like. The cellulose may be a chemically modified for example having a portion of its hydroxyl groups replaced by either ester or ether groups. For example, a portion of the hydroxyl groups may be etherified with propylene oxide to form a hydroxypropyl starch or etherified with monochloroacetic acid to form a carboxymethyl starch; however, alkoxylated starches or starch esters such as starch acetates may also be used.

The modified starch may be present in amounts of from about 1, from about 1.5, from about 2, up to about 5, up to about 4, or up to about 3 weight percent based on total weight of the composition. Commercial sources of modified starches with cross-linkable groups include Chemcar, Gumpro, Chemstar Products Company, Novidon, Oren, BlueCraft Argo Private Limited, GBA Products company Limited, INQUIL.

The drill-in fluid includes a bridging material which is included in formation of the filter cake. The bridging material can be a metal carbonate, such as calcium carbonate, a metal sulfate, such as barium sulfate, or a metal oxide, such as tetramagnesium oxides, or mixtures thereof. The bridging material can be present in the drill-in material in amounts of from 5, from 7, or from 10 up to 50, up to 40, up to 35, up to 30, up to 25, up to 20, or up to 15 weight percent based on total weight of the drill-in fluid. The bridging material can be provided in particulate or powder form having average particle sizes in the range of from 0.3, from 0.5, from 0.7, or from 1 up to 10,000, up to 1000, up to 500, up to 200, up to 150, up to 120, up to 100, up to 80 or up to 50 micrometers. Particle size can be the average particle size as stated by the vendor of the particle. Alternatively, particle size can be measured, for example, by laser diffraction as described herein.

The drill-in fluid comprises an additional ingredient that serves as a viscosifier or viscosity modifier. The viscosifier is selected from (a) ascorbic acid, an isomer thereof, or a salt of ascorbic acid or the isomer thereof (e.g., sodium erythorbate or sodium ascorbate), (b) a polymer particles, (c) emuslsions such as a miroemulsions or nanoemulsions (e.g., swelling micelle nano-emulsions, or (d) mixtures or two or more thereof.

For example, the ascorbic acid or its salt or a mixture thereof can be used in amounts of, for example from 0.01, or from 0.02 up to 0.1, up to 0.08, or up to 0.05 weight percent based on total weight of the drill-in fluid.

For example, the polymer particles can comprise, consist essentially of, or consist of copolymers of a monomer comprising two ethylenically unsaturated groups (such as isoprene or butadiene) and one or more additional ethylenically unsaturated monomers (such as styrene, or acrylonitrile.) For example, the copolymer can be a styrene butadiene copolymer. The polymer particles can be provided in a (liquid) latex emulsion form or can be provided as a powder. The particle size can be for example from 50, from 100, from 150 up to 1000, up to 900, up to 800, or up to 700 micrometer. Commercial sources of such polymers include Pexoseal™ products from Synthomer. The amount of such polymers can be for example, from 0.05, from 0.1 or rom 0.15 up to 1, up to 0.75 or up to 0.5 weight percent based on total weight of the drill-in fluid.

For example, the microemulsion or nanoemulsion, can be an emulsion comprising at least one surfactant, at least one non-polar liquid, and an aqueous phase. Optionally the microemulsion or nanoemulsion can also include one or more linker, chelating agent, cosolvent, and/or cosurfactant. The microemulsion can be a single-phase microemulsion. The microemulsion can be a Winsor I, Winsor II and Winsor III. A system or formulation is defined as: Winsor I when it contains a microemulsion in equilibrium with an excess oil phase; Winsor II when it contains a microemulsion in equilibrium with excess water; Winsor III when it contains a middle phase microemulsion in equilibrium with excess water and excess oil; or Winsor IV single-phase microemulsion, with no excess oil or excess water. The microemulsion can have submicron sized droplets.

The surfactants can include, but are not necessarily limited to nonionic, anionic, cationic, zwitteronic, or amphoteric surfactants or blends thereof. Co-solvents or co-surfactants such as alcohols are optional additives. Suitable nonionic surfactants include, but are not necessarily limited to, alkyl polyglycosides, sorbitan esters, polyglycol esters, methyl glucoside esters, or alcohol ethoxylates. Suitable anionic surfactants include, but are not necessarily limited to, alkali metal alkyl sulfates, alkyl or alkylaryl sulfonates, linear or branched alkyl ether sulfates and sulfonates, alcohol polypropoxylated and/or polyethoxylated sulfates, alkyl or alkylaryl disulfonates, alkyl disulfates, alkyl sulphosuccinates, alkyl ether sulfates, linear and branched ether sulfates, or mixtures thereof. Suitable cationic surfactants include, but are not necessarily limited to, arginine methyl esters, alkanolamines or alkylenediamides. In one nonlimiting embodiment at least two surfactants in a blend may be used to create microemulsions and nanoemulsions. Suitable surfactants may also include so-called extended surfactants containing a non-ionic spacer-arm central extension and an ionic or nonionic polar group. The non-ionic spacer-arm central extension may be the result of polypropoxylation, polyethoxylation, or a mixture of the two, in non-limiting embodiments. In another non-restrictive embodiment, the emulsion (e.g. microemulsion, nanoemulsion, etc.) may contain a cosurfactant which may be an alcohol having from about 3 to about 10 carbon atoms, in another non-limiting embodiment from about 4 to about 6 carbon atoms. A specific example of a suitable co-surfactant includes but is not necessarily limited to butanol and propanol. These co-surfactants may be alkoxylated, e.g. ethoxylated and/or propoxylated, although in most cases sufficient ethoxylation should be present to accomplish the purposes of the methods herein. In one non-restrictive embodiment the number of ethoxy units ranges from about 3 to about 15, alternatively from about 6, independently up to 15 about 10.

The non-polar liquid can include, for example, a synthetic fluid including, but not necessarily limited to, ester fluids; paraffins, isomerized olefins, or ester-based oils. Furthermore, diesel and mineral oils can be used as a non-polar liquid. Other suitable non-polar liquids include, but are not necessarily limited to terpenes such as limonene, pinene and other terpenes, BTWX such as xylene, mutual solvents, and the like.

The aqueous phase can be water or can be an aqueous composition such as a brine. Other polar liquids may be included such as alcohols or glycols may be included in the aqueous phase.

The salts in the brine can include, but are not necessarily limited to, ammonium chloride, sodium chloride, potassium chloride, calcium chloride, sodium bromide, calcium bromide, sodium formate, potassium formate, cesium formate, magnesium chloride or acetate or combinations thereof. The density of the brines may range from about 8.4 Ib/gal to about 15 Ib/gal (about 10 1 to about 1.8 kg/liter), although other densities may be given elsewhere herein. The salts for these high-density brines may include formate salts (e.g. HCOOK, HCOONa, HCOOCe), chloride salts (e.g. NaCl, KCl, CaCl2, ZnC12), bromide salts (e.g. NaBr, KBr, CaBr2, ZnBr2), acetate salts (e.g. cesium acetate, zinc acetate), nitrate salts, phosphate salts, citrate salts, tartrate salts, iodide salts, glutamate salts, diglutamate salts, nitriloacetate salts, and combinations thereof, with chloride salts (e.g. NaCl, KCl, CaCl2, MgCl2) optionally also present.

The optional linker can include, for example, amines, carboxylic acids, alcohols with more than 8 carbon atoms, glycols, polyols, phenols, and combinations thereof.

The optional chelating agent can be, for example, polylactic acid and/or a polyamino carboxylic acid (PACA) of the acrylic or maleic type, or carboxylated polysaccharides, or a 10 salt of PACA. Suitable PACAs and other chelating agents include, but are not necessarily limited to, nitrilotriacetic acid (NTA), ethylenediamine tetraacetic acid (EDTA), fra/7s-1,2-diaminocyclohexane-N,N,N',N',-tetraacetic acid monohydrate (CDTA), diethylenetriamine pentaacetic acid (DTPA), dioxaoctamethylene dinitrilo tetraacetic acid (DOCTA), 15 hydroxyethylethylenediamine triacetic acid (HEDTA), triethylenetetramine hexaacetic acid (TTHA), trans-1,2-diaminocyclohexane tetraacetic acid (DCTA), tripolyphosphates, polyphosphates, pyrophosphates, alphaether carboxylates, oxy-diacetate salts, carboxymethyl tartronate (CMT) and carboxymethyl oxy-succinate (CMOS), Tetrasodium glutamate diacetate (GLDA), citric, tartaric and tartronic salts and mixtures thereof. The concentration of chelating agent in the single phase microemulsion has a lower limit of about 1 volume %, alternatively of about 5 volume %, and an upper limit of about 30 volume %, alternatively about 20 volume %, and in another non-restrictive embodiment up to about 15 volume %.

The microemulsion or nanoemulsion can be used in the drill-in fluid in an amount of from 0.01. from 0.05, or from 0.1 up to 5, up to 4, up to 3, or up to 2 volume % based on total volume of the drill-in fluid.

The drill-in fluid can also include other ingredients such as oxygen scavengers, biocides, scale inhibitor, and fines stabilizers. Examples of oxygen scavengers include sodium sulfite and sodium bisulfite. The amount of oxygen scavenger can be for example, 0, or from greater than 0, from about 0.01, from about 0.02, or from about 0.03 up to about 0.1, up to about 0.08, or up to about 0.05 weight percent based on total weight of the composition. The oxygen scavenger is preferred when the viscosity modifier is a polymer or emulsion. Examples of biocides include, for example, aldehydes (such as glutaraldehyde), and quaternary ammonium based compounds. The amount of biocide can be, for example, from 0 to 2 weight percent based on total weight of the drill-in fluid. The optional chelating agent can be, for example, polylactic acid and/or a polyamino carboxylic acid (PACA) of the acrylic or maleic type, or carboxylated polysaccharides, or a 10 salt of PACA. Suitable PACAs and other chelating agents include, but are not necessarily limited to, nitrilotriacetic acid (NTA), ethylenediamine tetraacetic acid (EDTA), fra/7s-1,2-diaminocyclohexane-N,N, N',N',-tetraacetic acid monohydrate (CDTA), diethylenetriamine pentaacetic acid (DTPA), dioxaoctamethylene dinitrilo tetraacetic acid (DOCTA), 15 hydroxyethylethylenediamine triacetic acid (HEDTA), triethylenetetramine hexaacetic acid (TTHA), trans-1,2-diaminocyclohexane tetraacetic acid (DCTA), tripolyphosphates, polyphosphates, pyrophosphates, alpha-ether carboxylates, oxy-diacetate salts, carboxymethyl tartronate (CMT) and carboxymethyl oxy-succinate (CMOS), Tetrasodium glutamate diacetate (GLDA), citric, tartaric, tartronic, lactic, acetic, formic, salts and mixtures thereof. Examples of fines stabilizers include choline chloride, silane-based products, polyamine-based products, potassium chloride, and the like. The amount of fines stabilizers can be, for example, from 0 to up to about 0.6 volume percent based on total volume of the drill-in fluid.

The drill-in fluid can have plastic viscosity before and/or after hot roll of, for example, from 10, from 11, from 12, or from 13 up to 45, up to 42, up to 40, up to 35, or up to 30 or up to 25 Centipoise as measured according to API 13-B1 (2019) using a direct-reading viscometer.

The drill-in fluid can have a yield point of before and/or after hot roll of, for example, from 30, from 32, from 35 up to 60, or up to 55 pound force per 100 square feet (corresponding to about 14, 15, 17, 29 and 26 Pascals (Pa), respectively) as measured according to API 13-B1 (2019) using a direct-reading viscometer.

The drill-in fluid can provide a filter cake that can be readily removed when desired. Permeability testing can be used to determine lift-off pressure. For example, the of the wellbore core is saturated with formation brine to measure initial permeability and then oil is flowed through the core to measure the permeability for oil. Formation water is through the core again to see the relative permeability and then we saturate the core with oil again to displace. The drill-in fluid is pumped through the core to see the interaction between the core and the mud. At this point a filtercake is formed. Then oil is flowed from the bottom of the core and the pressure to lift the filtercake is measured.

The lift-off pressure can be, for example, less than 10, less than 5, less than 2, or less than 1.1 but is generally greater than 0.1 pounds per square inch (corresponding to about 69, 34, 14, 7.6, and 0.7 kPa, respectively).

Examples

Various formulations were prepared using the compositions as shown in Table 1 The bridging material used in these examples was calcium carbonate. The biocide was glutaraldehyde. The polymer particles were added as a powder. These formulations were then tested according to API 13-B1 (2019). The viscosity was tested using the direct reading viscometer method. The results are shown in Table 2. As can be seen the Example formulations 1 and 2 have improved (higher) low shear viscosity as compared to the Comparative formulation A. In addition, Example formulation 3 has improved (higher) low shear viscosity as compared to the Comparative formulation A at higher temperatures. The formulations were for the return permeability and liftoff with the results as shown in Table 3 where it is seen that Example 2 has a lower lift-off pressure than comparative example A. Formation damage was analyzed using synthetic formation brine as formation water and mineral oil as production oil, respectively. The Berea core plug was used for testing formation with a permeability of 400 to 600 millidarcy (md). All core plug samples are evacuated of air and pressure-saturated with synthetic formation brine. The core is loaded into an air displacing brine centrifuge configuration and spun to initial water saturation at 200 pounds per square inch (psi) (1.4 megaPascal (MPa) capillary pressure for a period of 4.0 hours. Then, the core is unloaded from the centrifuge and briefly vacuum saturated with the permeating oil phase. Each sample is loaded in a hydrostatic coreholder with an ⅛ inch (3.175 milllineters) thick spacer ring. A 1600 psi (11 MPa) net confining stress is applied, and 100 psi (0.7 MPa) pore pressure is established using the permeating oil through the system and sample. Temperature is elevated up to 270° F. Permeating oil is produced at a constant rate for approximately 10 pore volumes while monitoring differential pressure. Effective permeability to oil at irreducible water saturation can be determined. The drill-in fluid sample is circulated across the face of the core at an overbalance pressure of 500 psi (3.4 MPa) and a flow rate of 10 $cm^3$/min for a period of 10 minutes. The flow rate is reduced to 4.0 $cm^3$/minute for 50 minutes, and then reduced to 0.5 cm3/min for a period of 3.0 hours. Leakoff is monitored and volumes recorded. The drill-in fluid is set at 500 psi (3.4 MPa) overbalance and left for overnight static soaking for 12 hours. Permeating fluid is circulated across the inlet face of the sample at a rate of 30 $cm^3$/min for 30 minutes to potentially remove excess drill-in fluid. Next, permeating fluid is injected from the reservoir side of the core in the production flow direction at a low flow rate of 0.25 $cm^3$/min to determine the liftoff pressure of the filter cake. Permeating fluid is injected through the core plug at a constant flow rate of 1.0 $cm^3$/min in the production direction to determine when flow has reached an equilibrium. Regain effective permeability to oil at residual fluid saturation is then determined at two rates: 2 and 4 $cm^3$/min. The core sample is taken from permeameter and centrifuged at the same air-displacing-brine pressure as was used to establish irreducible water saturation (Swi) (200 psi (1.4 MPa) air-displacing-liquid). Coreholder, sample, and system were elevated to previous pressure conditions (net confining and pore pressure) while bypassing permeating oil through the system and around the sample. Permeating oil is injected through the core plug at a constant rate in the production direction while monitoring differential pressure. Regain effective permeability to oil at residual fluid saturation was determined at three rates at ambient temperature.

TABLE 1

| Ingredients (parts by weight except ingredients with *) | Comp. A | Comp. B | Example 1 | Example 2 | Example 3 |
|---|---|---|---|---|---|
| Water | 325.4 | 331.57 | 325.4 | 325.4 | 325.4 |
| MgO | 3 | — | 3 | 3 | 3 |
| Modified starch | 14 | 6 | 14 | 14 | 14 |
| Xanthum gum | — | 0.6 | — | — | — |
| Bridging Material | 40 | 40 | 40 | 40 | 40 |
| Lime | — | 0.05 | — | — | — |
| Biocide | 0.20 | 0.2 | 0.2 | 0.2 | 0.2 |
| Sodium erythorbate | — | — | 0.15 | — | — |
| PEXOSeal Polymer particles | — | — | — | 1 | — |
| Sodium sulfite | — | — | — | 0.15 | 0.15 |
| Microemulsion* | — | — | — | — | 0.1 |
| Fines Stabilizer* | — | — | — | — | 0.1 |
| Scale inhibitor* | — | — | — | — | 0.4 |

*Amounts are volume percent based on total volume of the composition.

TABLE 2

| | Comparative A | | Comparative B | | Example 1 (ascorbate type) | | Example 2 ("latex" type which is a type of emulsion) | | Example 3 (nano/micro-emulsion) | |
|---|---|---|---|---|---|---|---|---|---|---|
| Rheology | b/4 hot roll | After 270 F. hot roll | b/4 hot roll | After 270 F. hot roll | b/4 hot roll | After 270 F. hot roll | b/4 hot roll | After 270 F. hot roll | b/4 hot roll | After 270 F. hot roll |
| Dial reading at 600 rpm | 65 | 72 | 61 | 21 | 65 | 69 | 63 | 77 | 71 | 104 |
| Dial reading at 300 rpm | 47 | 53 | 45 | 12 | 52 | 53 | 49 | 60 | 52 | 80 |
| Dial reading at 200 rpm | 39 | 44 | 38 | 9 | 44 | 46 | 42 | 52 | 43 | 69 |
| Dial reading at 100 rpm | 28 | 32 | 26 | 5 | 33 | 35 | 33 | 40 | 31 | 54 |
| 6 rpm | 9 | 10 | 9 | 1 | 15 | 16 | 17 | 14 | 8 | 19 |
| 3 rpm | 8 | 8 | 8 | 0 | 15 | 15 | 13 | 13 | 6 | 15 |
| 10 sec (lbforce/100 square feet) | 7 | 7 | 8 | 0 | 15 | 15 | 16 | 13 | 5 | 16 |
| 10 min (lbforce/100 square feet) | 13 | 10 | 9 | 0 | 30 | 25 | 38 | 17 | 7 | 16 |
| Plastic Viscosity, cP | 18 | 19 | 16 | 9 | 13 | 16 | 14 | 17 | 13 | 24 |
| Yield Point (lbforce/100 square feet) | 29 | 34 | 29 | 3 | 39 | 37 | 35 | 43 | 33 | 52 |

TABLE 3

Return perm data on Lift off and % return permeability

| Fluids tested on return perm | Lift off pressure (pounds/square inch) | % Return perm |
|---|---|---|
| Comparative A | 1.31 | 79% |
| Example 2: | 1.08 | 80% |

Set forth below are some Aspects of the foregoing disclosure:

Aspect 1: A drill-in fluid comprising water, a metal oxide, a modified starch, a bridging agent, and at least one of (a) an ascorbic acid or an isomer thereof or a salt of ascorbic acid or the isomer thereof, (b) polymeric particles, or (c) an emulsion which is a microemulsion or a nanoemulsion.

Aspect 2: The drill-in fluid of Aspect 1 wherein the metal oxide comprises magnesium oxide, cupric oxide, calcium oxide, iron oxide or zinc oxide.

Aspect 3: The drill-in fluid of Aspect 1 or 2 wherein the metal oxide has an average particle size of from 1, from 10, from 15, or from 20 up to 100, up to 90, up to 80, or up to 75 micrometers.

Aspect 4: The drill-in fluid of any one of the previous Aspects wherein the modified starch comprises cross-linkable groups.

Aspect 5: The drill-in fluid of any one of the previous Aspects wherein bridging agent comprises a metal carbonate, a metal sulfate, or a metal oxide.

Aspect 6: The drill-in fluid of any one of the previous Aspects wherein the bridging material has average particle sizes in the range of from 0.5, from 0.7, or from 1 up to 10,000, up to 1000, up to 500, up to 200, up to 150, up to 120, up to 100, up to 80 or up to 50 micrometers.

Aspect 7: The drill-in fluid of any one of the previous Aspects comprising the ascorbic acid or the isomer thereof or the salt of ascorbic acid or the isomer thereof.

Aspect 8: The drill-in fluid of Aspect 7 comprising sodium erythorbate or sodium ascorbate.

Aspect 9: The drill-in fluid of any one of the previous Aspects comprising polymeric particles.

Aspect 10: The drill-in fluid of Aspect 9 wherein the polymeric particles comprise a copolymer of a monomer comprising two ethylenically unsaturated groups, preferably isoprene or butadiene and one or more additional ethylenically unsaturated monomers preferably styrene, or acrylonitrile, wherein preferably the copolymers are styrene butadiene copolymers.

Aspect 11: The drill-in fluid of Aspect 9 or 10 wherein the polymeric particles have an average particle size of from 50 from 100, from 150 up to 1000, up to 900, up to 800, or up to 700 micrometers.

Aspect 12; The drill-in fluid of any one of the previous Aspects comprising the emulsion, wherein the emulsion comprises a surfactant, a non-polar, liquid and an aqueous phase.

Aspect 13: The drill-in fluid of Aspect 12 wherein the emulsion is a microemulsion.

Aspect 14; The drill-in fluid of any one of the previous Aspects wherein the drill-in fluid comprises based on total weight of the drill-in fluid:

70 to 98 weight percent water, from 0.5, from 0.6, or from 0.7 up to 1.5, up to 1.2, or up to 1 weight percent of the metal oxide, from 5, from 7, or from 10 up to 50, up to 40, up to 35, up to 30, up to 25, up to 20, or up to 15 weight percent of the bridging material, and 1 to 5 weight percent of the modified starch.

Aspect 15 The drill-in fluid of Aspect 14 comprising from 0.05, from 0.1 or rom 0.15 up to 1, up to 0.75 or up to 0.5 weight percent the polymeric particles based on total weight of the drill-in fluid Aspect 16: The drill-in fluid of Aspect 14 comprising 0.01 to 0.05 weight percent of the ascorbic acid, the isomer thereof, or the salt of ascorbic acid or the isomer thereof based on total weight of the drill-in fluid.

Aspect 17: The drill-in fluid of Aspect 15 comprising from 0.01 to 2 volume % of the microemulsion or the nanoemulsion based on total volume of the drill-in fluid.

Aspect 18: A method comprising injecting the drill-in fluid of any one of the preceding Aspects into a wellbore.

Aspect 19: The method of Aspect 18 wherein the drill-in fluid is exposed to temperatures of 250 to 300° F. (120 to 150° C.).

Aspect 20: The method of Aspect 18 or 19 wherein a filter cake is formed and is removed at pressures of less than 1.1 pounds per square inch.

The use of the terms "a" and "an" and "the" and similar referents in the context of describing the invention (especially in the context of the following claims) are to be construed to cover both the singular and the plural, unless otherwise indicated herein or clearly contradicted by context. Further, it should be noted that the terms "first," "second," and the like herein do not denote any order, quantity, or importance, but rather are used to distinguish one element from another. The terms "about", "substantially" and "generally" are intended to include the degree of error associated with measurement of the particular quantity based upon the equipment available at the time of filing the application. For example, "about" and/or "substantially" and/or "generally" can include a range of ±8% of a given value.

The teachings of the present disclosure may be used in a variety of well operations. These operations may involve using one or more treatment agents to treat a formation, the fluids resident in a formation, a borehole, and/or equipment in the borehole, such as production tubing. The treatment agents may be in the form of liquids, gases, solids, semi-solids, and mixtures thereof. Illustrative treatment agents include, but are not limited to, fracturing fluids, acids, steam, water, brine, anti-corrosion agents, cement, permeability modifiers, drilling muds, emulsifiers, demulsifiers, tracers, flow improvers etc. Illustrative well operations include, but are not limited to, hydraulic fracturing, stimulation, tracer injection, cleaning, acidizing, steam injection, water flooding, cementing, etc.

While the invention has been described with reference to an exemplary embodiment or embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the claims. Also, in the drawings and the description, there have been disclosed exemplary embodiments of the invention and, although specific terms may have been employed, they are unless otherwise stated used in a generic and descriptive sense only and not for purposes of limitation, the scope of the invention therefore not being so limited.

What is claimed is:

1. A drill-in fluid comprising water, a metal oxide, a modified starch, a bridging agent comprising a metal carbonate in an amount of 5 to 50% by weight based on total weight of the drill-in fluid, and at least one of an ascorbic acid or an isomer thereof or a salt of ascorbic acid or the isomer thereof.

2. The drill-in fluid of claim 1 wherein the metal oxide comprises magnesium oxide, cupric oxide, calcium oxide, iron oxide or zinc oxide.

3. The drill-in fluid of claim 1 wherein the metal oxide has an average particle size of from 1 to 100 micrometers.

4. The drill-in fluid of claim 1 wherein the modified starch comprises cross-linkable groups.

5. The drill-in fluid of claim 1 wherein the bridging agent further comprises a metal sulfate, or a metal oxide.

6. The drill-in fluid of claim 1 wherein the bridging material has average particle sizes in the range of from 0.3 to 10000 micrometers.

7. The drill-in fluid of claim 1 comprising sodium erythorbate or sodium ascorbate.

8. The drill-in fluid of claim 1 wherein the drill-in fluid comprises based on total weight of the drill-in fluid:

70 to 98 weight percent water, 0.5 to 1.5 weight percent of the metal oxide, 5 to 27 weight percent of the bridging material, 1 to 5 weight percent of the modified starch.

9. The drill-in fluid of claim 8 comprising 0.01 to 0.05 weight percent of the ascorbic acid, the isomer thereof, or the salt of ascorbic acid or the isomer thereof based on total weight of the drill-in fluid.

10. A method comprising injecting the drill-in fluid of claim 1 into a wellbore.

11. The method of claim 10 wherein the drill-in fluid is exposed to temperatures of 250 to 300° F.

12. The method of claim 10 wherein a filter cake is formed and is removed at pressures of less than 1.1 pounds per square inch.

* * * * *